Figure 1:
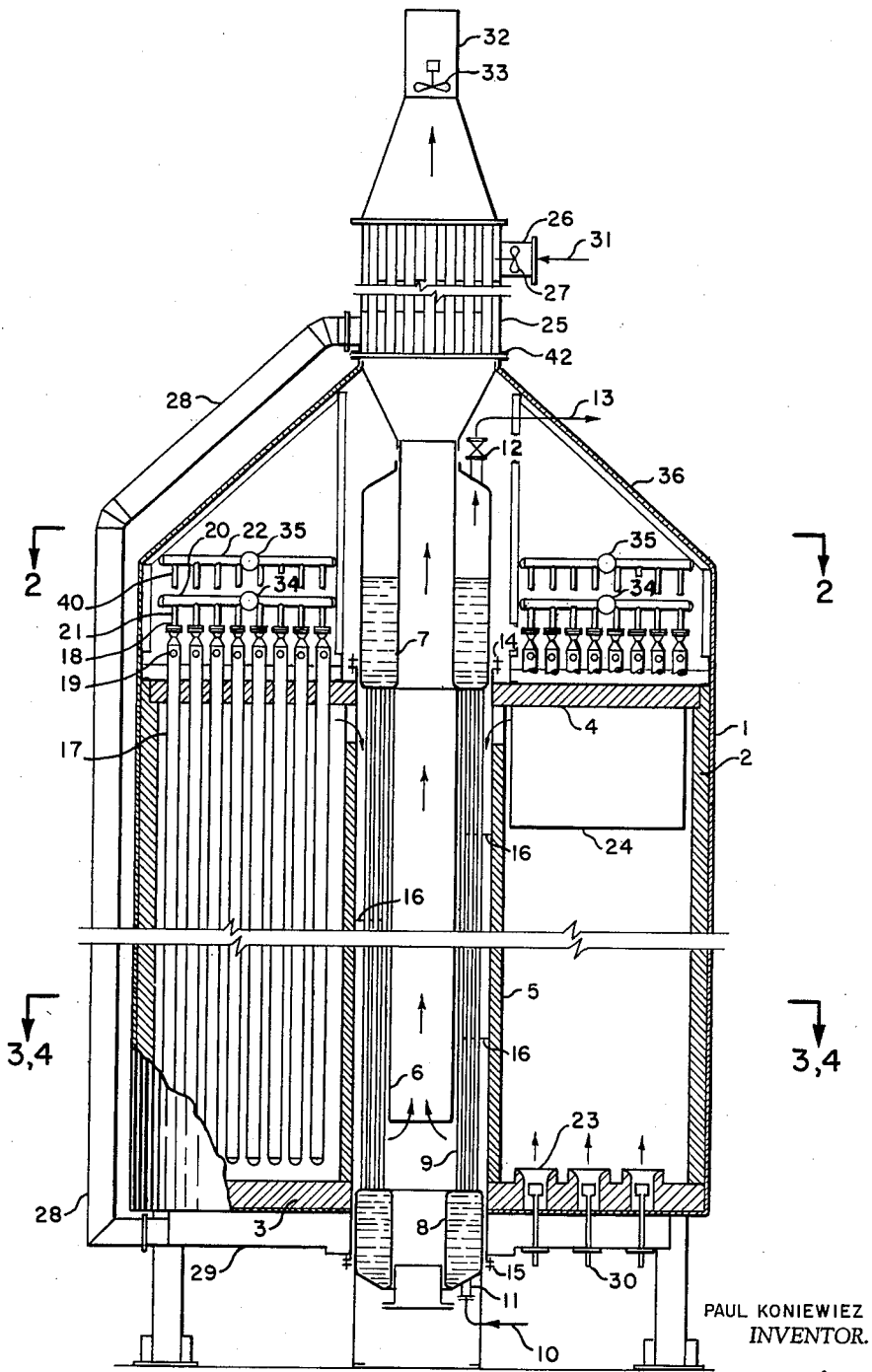

April 14, 1964

PAUL KONIEWIEZ
NOW BY CHANGE OF NAME
PAUL KORWIN 3,129,065

UPRIGHT FLUID HEATING FURNACE WITH INTEGRAL HEAT RECOVERY MEANS

Filed Sept. 14, 1960

5 Sheets-Sheet 4

PAUL KONIEWIEZ
INVENTOR.

BY J. T. Chaloty

AGENT

United States Patent Office 3,129,065
Patented Apr. 14, 1964

3,129,065
UPRIGHT FLUID HEATING FURNACE WITH INTEGRAL HEAT RECOVERY MEANS
Paul Koniewiez, Flushing, N.Y., now by change of name Paul Korwin, assignor to Chemical Construction Corporation, New York, N.Y., a corporation of Delaware
Filed Sept. 14, 1960, Ser. No. 55,965
14 Claims. (Cl. 23—277)

This invention relates to an improved fluid heating furnace, in particular to an improved hydrocarbon reform furnace. A combination of furnace and heat exchange apparatus elements has been devised which permits integral heat recovery within the furnace itself. The improved apparatus of the present invention thus provides better recovery of usable heat, and also simplifies the overall construction of furnaces for primary hydrocarbon reform or other fluid heating usages, while accomplishing internal recovery of waste heat.

The present invention will be described in relation to the process of hydrocarbon conversion known as primary reforming, which is widely employed to produce synthesis gas and hydrogen. In this well-known process, a hydrocarbon fluid such as methane is catalytically reacted with steam at elevated temperatures, to produce a reformed gas mixture containing principally hydrogen, carbon monoxide and carbon dioxide. The overall reaction is endothermic, and consequently the usual practice is to pass the input mixture of hydrocarbon and steam through an externally heated tube or group of tubes. The tubes are packed with solid catalyst granules. The hot product reformed gas mixture is withdrawn from the reformer unit and then passed to further processing. The requisite heating is usually provided by burning a hydrocarbon fuel with air, external to the catalyst-filled reformer tubes. Since the reform reaction must be carried out at a highly elevated temperature, the flue gas generated by burning the hydrocarbon fuel is removed at a relatively high temperature. Sensible heat in this flue gas is usually recovered in an auxiliary waste heat boiler.

Thus a typical primary reform installation usually includes a reform furnace provided with catalyst-filled reform tubes and burners, together with a flue gas waste heat boiler. In the present invention, a unitary apparatus combination is provided whereby all the aforementioned elements are contained in a single apparatus. The advantages of this apparatus arrangement are numerous. More useful heat is recovered, since heat losses are reduced. This is because the apparatus of the present invention is unitary and compact, thus heat losses from transfer ducts, connectors and other external surfaces exposed to ambient temperature conditions are eliminated. In addition, the unitary construction of the apparatus of the present invention is less complex and easier to fabricate than the aggregative designs of the prior art. This in turn results in simpler and cheaper fabrication and erection procedures and costs. Another thermal advantage to the unitary apparatus of the present invention is that, to a limited but significant extent, it becomes possible to recover a portion of the waste heat from the flue gas at a relatively high temperature. This is highly important, since to a certain extent it results in heat transfer by radiation rather than convection, which is highly advantageous since faster heat transfer and greater efficiency in utilization of heat transfer surface is thereby achieved.

Finally, the unitary arrangement of the apparatus of the present invention now makes it possible to connect individual reformer tubes to major gas transfer ducts by means of standardized linkages, thus eliminating individual design and fabrication of such linkages as found in the prior art. Typical of such prior art is U.S. Patent No. 2,660,519, in which FIGURE 4 clearly demonstates the individuality and lack of symmetry of such prior art linkages. In the present invention, symmetry of reformer tubes about a central axis is achieved, in a manner so as to permit standardized design and fabrication of these linkages.

It is an object of this invention to provide an improved furnace apparatus for fluid heating, in particular for the primary steam reforming of hydrocarbons.

Another object is to provide an apparatus for this purpose with unitary centralized arrangement of apparatus elements.

A further object is to provide a single unit of apparatus for this purpose in which the combined reformer and waste heat recovery functions are achieved.

An additional object is to provide an apparatus for this purpose with improved symmetry of elements, with more uniform and equalized heat transfer and improved heat recovery.

Another object is to provide a combined furnace and waste heat boiler apparatus which is of simplified and symmetrical arrangement, thus making possible improved ease of construction and repair.

An object is to provide an improved apparatus for primary hydrocarbon reforming with central waste heat boiler.

Still another object is to provide improved means for radiant heating of reform tubes at the sections of greatest heat consumption.

Figure 2:
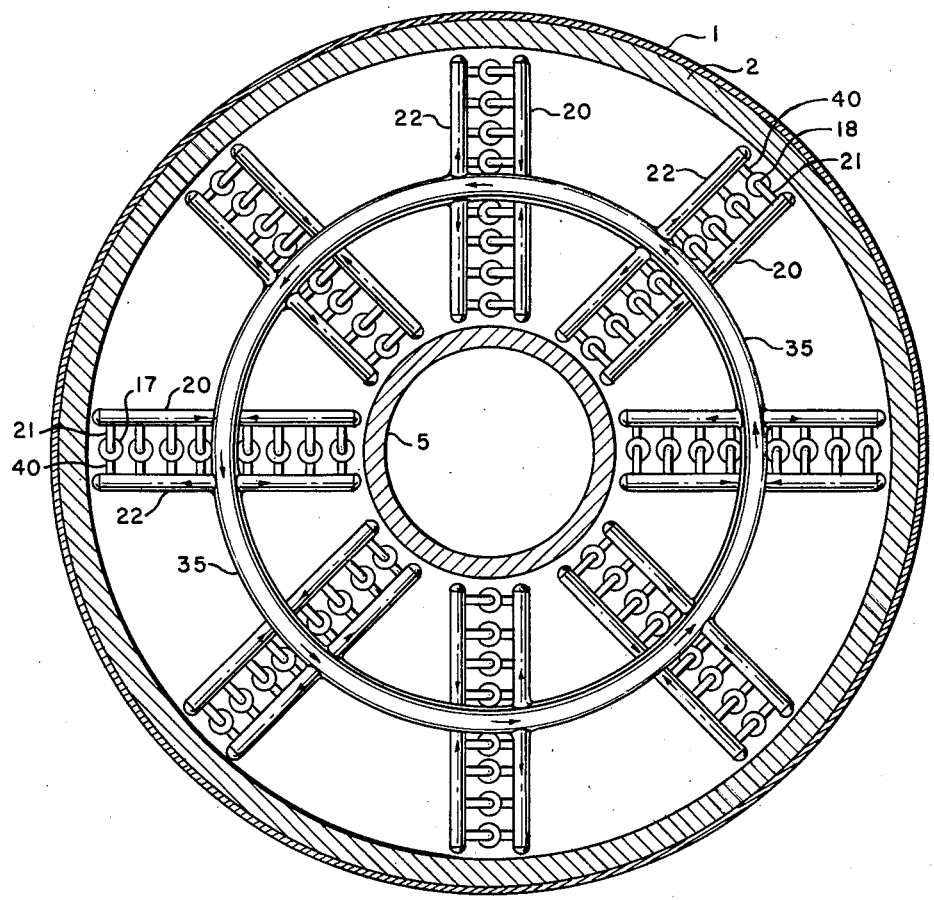
Figure 3:
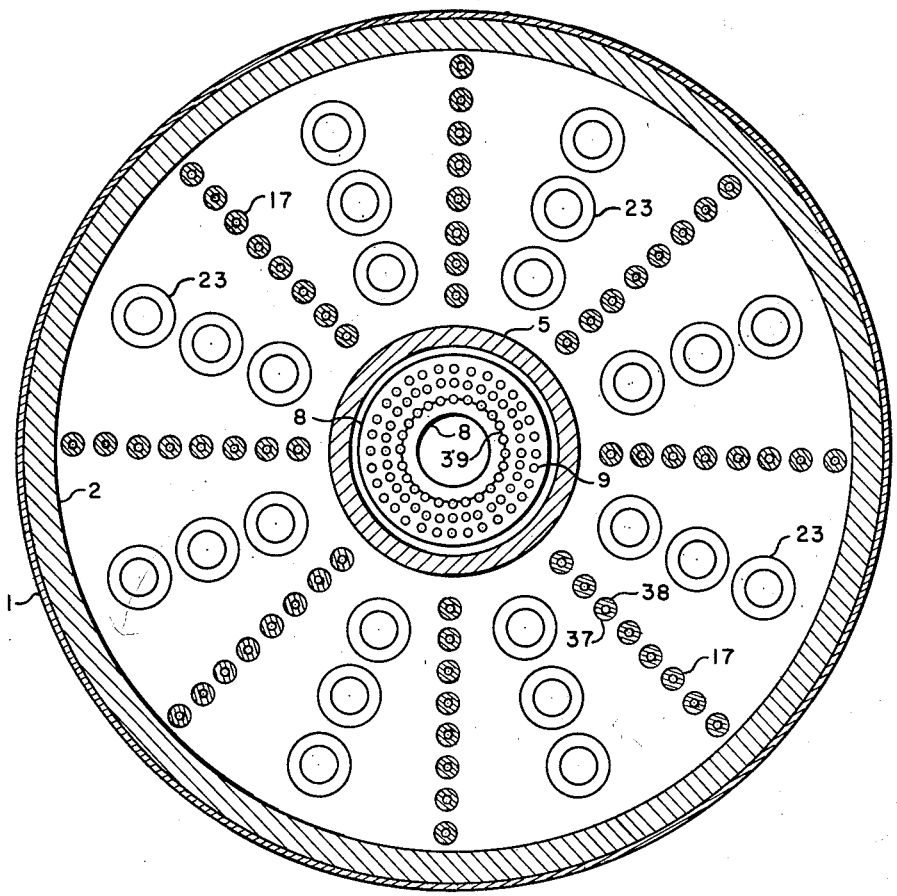
Figure 4:
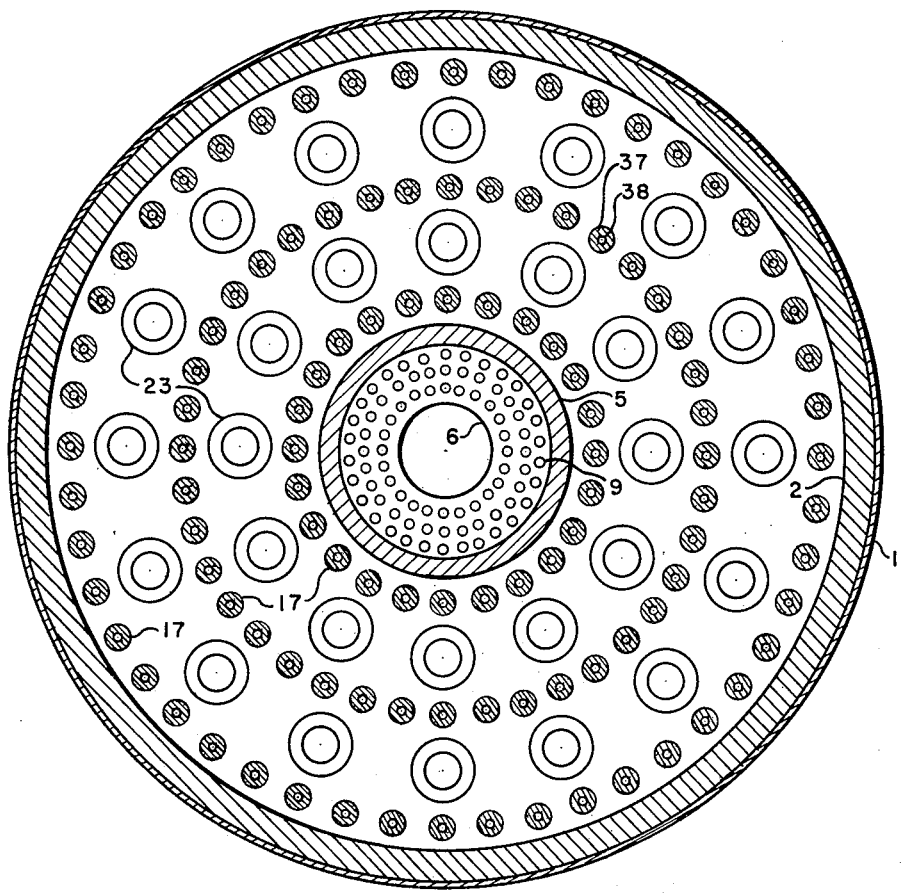
Figure 5:
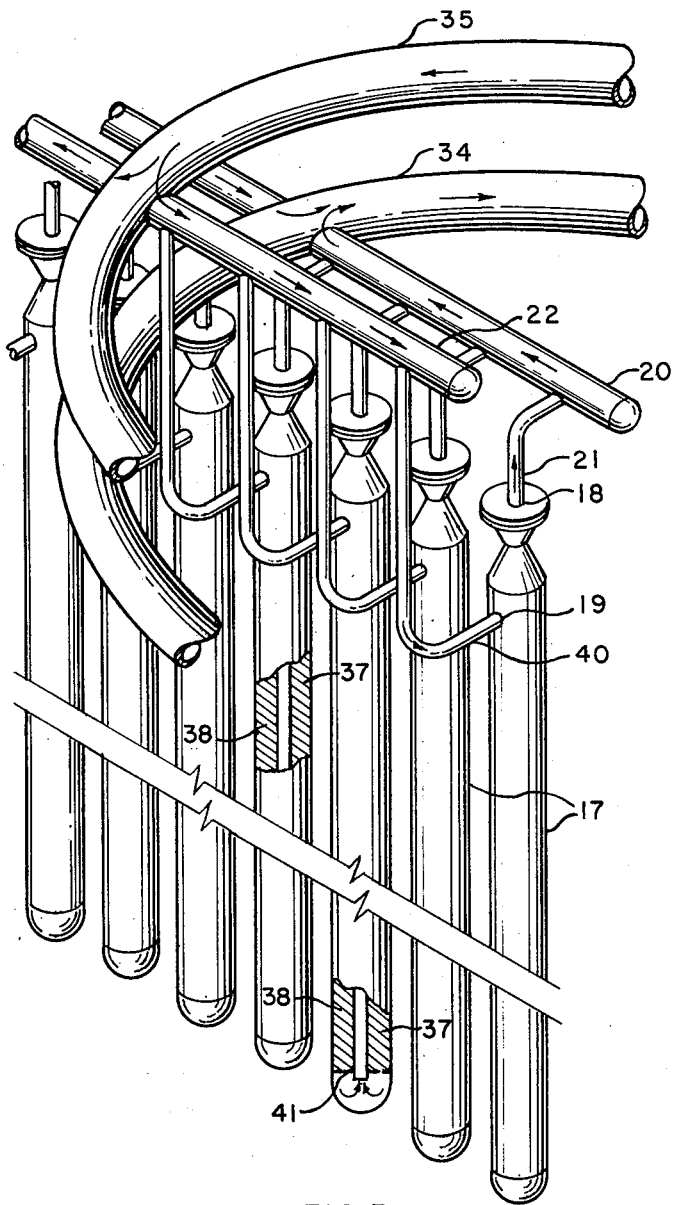

These and other objects and advantages of the present invention will become evident from the following description of the invention. Referring to the figures, FIGURE 1 is an elevation view of a preferred embodiment of the present invention. FIGURE 2 is a plan view of the apparatus, taken on section 2—2 of FIGURE 1. FIGURE 3 is a plan view taken on section 3—3 of FIGURE 1. FIGURE 4 presents an alternative arrangement of reformer tubes and burners, and is a plan view similar to FIGURE 3. FIGURE 5 is an isometric view of adjacent reformer tubes, showing tube internals and linkages to transfer manifolds.

Referring now to FIGURE 1, the entire reformer furnace apparatus and waste heat boiler is shown in elevation view. The unit is held in container 1, provided with refractory side lining 2, refractory lined bottom or base 3 and refractory lined top or roof 4. Container 1 is preferably a vertically extending cylinder, although other suitable configurations such as a square or hexagonal cross-section may be adopted and are within the scope and concept of the present invention. In some instances, external refractory linings or insulation, not shown, may also be provided.

A centrally positioned refractory partition duct 5 is provided within the unit, and extends upwards from base 3 to the proximity of roof 4. A clearance is provided between duct 5 and roof 4, to allow for passage of flue gas downwards into duct 5. Baffles, not shown, may be provided in this clearance space to channel flue gas flow more directly across the upper portions of reformer tubes 17 prior to passage of flue gas into partition duct 5. A flue gas duct 6 extends centrally downwards within duct 5. Duct 6 is preferably supported by and attached to upper steam drum 7, although other or auxiliary support brackets, not shown, may be provided whereby duct 6 could be supported by lower boiler water drum 8. Duct 6 extends downwardly in proximity to drum 8, with clearance being provided to allow for passage of flue gas upwards into duct 6. Water tubes 9 extend between lower water drum 8 and upper steam drum 7. Boiler feed water is passed into drum 8 via line 10 and inlet means 11. As will be apparent to those skilled in the art, boiler feed water may also be passed into the system via a steam drum 7. Steam is withdrawn from drum 7 via valve 12 and line 13. The steam boiler units are separately supported by upper and lower support means independent of the reformer, and thus the boiler extends freely through the reformer unit to allow for differential thermal expansions. Closure is provided by upper seal means 14 and lower seal means 15. Various standard steam boiler accessories, such as safety relief valve, blowdown means, auxiliary burner, liquid level controls, pressure gauge, etc., have beeen omitted from FIGURE 1 in the interest of clarity. It should be understood that such accessories and auxiliaries will be furnished in practice. The boiler tubes section is preferably provided with flue gas baffles 16, whereby the gas flow path attains a pattern with flow direction components transverse to the boiler tubes 9, as shown. This naturally results in improved heat transfer.

Reformer tube assemblies 17 are vertically oriented within the furnace section of the unit. This section is defined by refractory walls 2, base 3, roof 4, and partition 5. Tube assemblies 17 are preferably supported and suspended within the furnace section by upper support means, not shown. Thus tube assemblies 17 hang within the furnace section, and expand freely downwards. It should be understood that various known support means for reformer tubes may be employed within the scope of the present invention, such as lower or intermediate supports, fluid transfer connections at the lower ends of the tubes, etc.

Each of the tube assemblies 17 consists of a double tube since concentric inner and outer tubes are provided. Broadly speaking, alternative reformer tube configurations may be employed within the scope of the present invention. Thus for example, tube 17 could in some instances consist merely of a single tube packed with catalyst, and provided with upper and lower process fluid connections. However, in the preferred embodiment as shown in FIGURE 1, central opening 18 leads to the inner tube, not shown. Outer opening 19 leads to the annular space between an inner and outer tube. Manifold 20 is connected by identical and interchangeable linkages 21 with openings 18, while manifold 22 is connected by another group of similarly identical linkages 40 with openings 19. It should be understood that all of linkages 21 are identical with each other, however, linkages 21 are of necessity geometrically dissimilar to the linkages 40 which connect manifold 22 with openings 19. The preferred mode of operation, with the annular space between the inner and outer tubes filled with catalyst, is to pass the inlet mixture of fluid hydrocarbon and steam via duct 35 through manifold 22 and linkages 40 into openings 19, with product reformed gas removal via openings 18, linkages 21 and manifold 20 to duct 34. However, it will be readily appreciated that the flow sequence may be reversed, thus manifold 20 may receive the inlet mixture of steam and fluid hydrocarbon from circular distribution duct 34, with manifold 22 serving to collect and transfer the outlet reformed gas mixture to circular duct 35.

The reformer tube assemblies 17 are externally heated by fluid hydrocarbon burners 23, positioned in base 3. Other burners, not shown, may also be positioned along wall 2 to assist in providing uniform temperature conditions within the furnace. Burners 23 burn a suitable fluid hydrocarbon fuel with air to generate and maintain a highly elevated temperature in the furnace section. The temperature is usually maintained above 1700° F. in this section of the unit, so as to provide predominantly radiant heating of reformer tube assemblies 17. The rising hot flue gas also heats metallic plates 24 which are suspended at the top of the furnace section between banks of tubes. Plates 24 provide a further radiating heat effect in the upper portion of the unit, where heat consumption is greatest.

In operation, the catalyst packed reformer tubes are externally heated in the furnace section, primarily by radiant heat. The hydrocarbon-steam mixture is passed into the catalyst-packed annular section of each reformer tube via manifold 22 and linkages 40 to openings 19. The gas mixture is heated and catalytically reformed while passing downwards through this annular section. The reformed gas mixture is centrally passed upwards through the inner tube, and is withdrawn from the reformer tube assembly 17 via outlet 18, linkage 21 and manifold 20.

The rising hot flue gas from burners 23, after serving to heat reformer tube assemblies 17 and plates 24, passes centrally inwards through the clearance between partition duct 5 and roof 4. The flue gas now passes downwards in the annular space between partition duct 5 and flue gas duct 6, and is cooled while imparting heat to water tubes 9, thus generating steam within tubes 9. The steam thus produced rises within tubes 9 and is collected in drum 7 and withdrawn via valve 12 and line 13. Makeup boiler feed water is passed into drum 8 via line 10 and feed inlet means 11.

The cooled flue gas now passes centrally inwards through the lower clearance between flue gas duct 6 and boiler water drum 8. The flue gas next passes upwards out of the apparatus through duct 6. The flue gas will usually still contain sufficient low-level sensible heat to warrant provision of a further heat recovery unit such as gas-to-gas heat exchanger 25. Thus in a preferred embodiment, the apparatus is combined with heat exchanger 25 which serves to preheat the combustion air passed to burners 23. The input air stream 31 is directed through inlet duct 26 by blower 27, and is heated in the shell side of exchanger 25. The hot air now passes via duct 28 to lower air manifold 29 below base 3. Manifold 29 serves to deliver the preheated hot air to burners 23. It should be understood that heat exchanger 25 may also be alternatively or additionally employed to preheat the fluid hydrocarbon fuel being passed via 30 to burners 23 or to preheat the boiler feed water being passed via 10 to drum 8 or for other heating purposes.

The flue gas is finally dispersed to atmosphere via stack 32. Induced draft fan 33 may be provided inside stack 32 to assist in providing sufficient overall furnace draft.

It will readily be appreciated that, in practice, one of the main features and advantages of the apparatus of the present invention is the relative ease of repair or replacement of units or elements which is made possible by the unique apparatus configuration. Thus, by virtue of the suspension of the waste heat boiler centrally within the furnace section, high temperature seals and connection ducts are eliminated. Differential thermal expansion and alignment problems are eliminated. In practice, the waste heat boiler opening in roof 4, defined by seal 14, is slightly larger than the lower opening in base 3 defined by seal 15. Similarly, the top dimension of cover plate 36 defined by connecting flange 42 is larger than the dimension of seal 14. This configuration facilitates the removal of the entire waste heat boiler section for repair or overhaul, since it thus may be readily lifted upwards and out of the unit on such occasions.

Referring now to FIGURE 2, which is a plan view of the apparatus taken on section 2—2, the symmetry and uniformity of the piping linkages to the individual reformer tubes is readily apparent. The input gas mixture of steam and fluid hydrocarbon is passed into reformer tubes 17 via duct 35, manifolds 22 and linkages 40. The reformed gas mixture is derived from individual reformer tubes 17 through each of central openings 18, and passed through each of linkages 21 to manifolds 20. Circular product removal duct 34, not visible in this view, receives product reformed gas mixture from each of manifolds 20, and thereafter transfers the gas mixture out of the unit by conduit means, not shown. It should be noted that this apparatus arrangement permits the standardized and uniform dimensioning of linkages 21, whereas the dimensions of the prior art linkages had to be individually designed for each reformer tube due to the dimensions and arrangement of the appartus, as for example in U.S. Patent No. 2,660,519. The linkages 40 between manifolds 22 and outer openings 19 in the reformer tubes have also been indicated. Openings 19 are not visible in this view. Manifolds 22 will obviously be disposed above manifolds 20, as shown in FIGURE 1. In addition, each manifold 22 is displaced to the opposite side of each bank of tubes from the corresponding manifold 20.

FIGURE 3 is a sectional plan view of the apparatus, taken on section 3—3 of FIGURE 1. FIGURE 3 shows the preferred arrangement of reformer tubes 17 within the furnace section, namely in linear banks of tubes radiating from the geometric center of the unit. Burners 23 are correspondingly arranged symmetrically in groups within each section, between successive banks of tubes. It will be understood that, in practice, the linear spacing between adjacent reformer tubes 17 in each bank may be varied, as well as the linear spacing between adjacent burners 23 in each group of burners. Thus, although the apparatus is shown with identical spacing between tubes and also between burners, in practice it will prove advantageous in some instances to vary these spacings, particularly by providing more spacing between burners nearer the center of the apparatus. The reason for this is because, in practice, a horizontal temperature gradient may be established in the furnace section, with higher temperatures towards the center of the apparatus, due to geometric concentration of burners. Thus, providing greater spacing between burners, or less spacing between reformer tubes which are disposed nearer to the center of the apparatus serves to provide more uniform temperature within the furnace section.

FIGURE 3 further shows a cross-sectional view of the internal arrangement of reformer tubes 17. Thus catalyst bed 37 is shown disposed in the annular space between tube 17 and central reformed gas return tube 38.

FIGURE 3 also shows an alternative modified arrangement of boiler tubes 9, whereby flue gas duct 6 may be eliminated and its function performed in another manner. Thus in FIGURE 3, the innermost circular grouping of steam boiler tubes 9 is shown with connecting partitions 39 between the tubes. These partitions 39 may consist of bars suspended between the tubes, or may be actual metal strips fastened or welded to the tubes. In any case, partitions 39 serve to prevent transverse flue gas flow into the center of the apparatus, and thus flue gas flow is directed downwards past the tubes 9 before passing upwards and out through the center of the apparatus. With this modification, an auxiliary burner for greater steam generation may be centrally positioned below or adjacent to drum 8. Such a burner could be employed to heat the flue gas passing upwards inside the duct defined by partitions 39, thus further heating the group of water tubes linked by partitions 39.

FIGURE 4 is typical of one of the numerous alternative arrangements of reformer tubes and burners which may be adopted in the apparatus of the present invention. In FIGURE 4, the burners 23 and reformer tubes 17 are shown arranged in alternate concentric circular groupings within the furnace section. Such an arrangement would prove advantageous in larger installations, however, in general the linear radial banks grouping previously described are preferred, due to the symmetry and uniformity of manifolding and linkages which is thereby achieved. FIGURE 4 also shows gas duct 6 in the preferred embodiment, together with water tubes 9.

FIGURE 5 presents an isometric view of adjacent reformer tubes in a bank, showing linkages to transfer manifolds in perspective. In addition, tube internals are also allustrated in cutaway view for additional clarification of the reformer tube internals. Thus the incoming feed gas mixture of hydrocarbon and steam passes into the apparatus via circular duct 35 from an external supply source, not shown. The feed stream flows from duct 35 to manifold 22, through linkages 40 to openings 19, and finally to individual reformer tubes 17. The feed mixture is now heated and catalytically converted to reformed gas, while passing downwards through the annular space between reformer tube 17 and inner return tube 38. The gas is, of course, in contact with catalyst bed 37 while thus passing downwards. Bed 37 is retained by screen support means 41, so that the reformed gas stream freely passes into the inner return tube 38 at the bottom of tube 17.

The reformed gas stream now passes upwards through central return tube 38, and out of the reformer tube to manifold 20 through upper outlet 18 and linkage 21. From manifold 20 the reformed gas proceeds to circular duct 34 and thence out of the apparatus.

Typical operating conditions for the apparatus of the present invention include a furnace section operating temperature between 1700° F. to 2000° F., with initial flue gas temperature of about 1700° F. before passage through the waste heat boiler section of the apparatus. Final flue gas temperature is about 550° F. Boiler feed water input temperature is 220° F., with outlet steam temperature of 420° F. (300 p.s.i.g. steam). Net steam production is 14,000 pounds per hour plus 1500 pounds per hour blowdown, for a flue gas flow rate of 1750 mols per hour.

It should be understood that various modifications and equivalents are within the scope of the present invention. Thus, for example, the waste heat boiler apparatus could be utilized with modifications as a conventional heat exchanger if so desired. In such instances the inlet drum 8 would be supplied with a conventional high temperature heat exchange fluid such as Dowtherm, with removal of heated fluid from upper drum 7 to external utilization as a heat source and subsequent recycle to inlet drum 8.

The broadest scope of utilization of the apparatus of the present invention is as a generalized fluid heating furnace. In this case reformer tubes 17 would be supplied with fluid to be heated or thermally converted or treated, either catalytically or otherwise. In this respect various alternative or equivalent linkage arrangements for the reformer tubes, similar to those duct and linkages illustrated, will occur to those skilled in the art. For example, it will be understood that one suitable modification for generalized fluid heating would be to extend reformer tubes 17 through the base 3, and provide lower external connections to the tubes whereby the fluid to be heated is simply passed only once through the tubes, either from top to bottom or vice versa. Alternative or auxiliary bottom supports may also be provided for the tubes 17. Likewise, intermediate supports may be provided. Other variations and modifications within the scope of the present invention will occur to those skilled in the art.

I claim:

1. Upright fluid heating furnace with integral waste heat steam boiler comprising a vertically extending container, a vertical partition duct centrally disposed within said container, said partition duct extending upwards from the base of said container and terminating near the top of said container, a plurality of vertically oriented heater tubes disposed within said container and external to said partition duct, means for passing process fluid through said heater tubes, a plurality of hydrocarbon combustion burners positioned in the base of said container and external to said partition duct, means for conducting fluid hydrocarbon fuel and oxygen-containing gas to said burners, a central flue gas duct positioned within said partition duct and extending vertically upwards from near the base of said container to upper flue gas disposal means external to said container, a plurality of vertically oriented boiler water tubes disposed in the space between said flue gas duct and said partition duct, means for passing boiler feed water into said boiler tubes, and steam recovery means connected to the upper ends of said boiler tubes.

2. Upright fluid heating furnace with integral heat recovery unit comprising a vertically extending cylindrical refractory-lined container, a concentric circular partition duct coaxially aligned within said container and extending upwards from the base of said container, said partition duct terminating near the top of said container, a plurality of vertically oriented heater tubes disposed within said container in the annular furnace section external to said partition duct, means for passing process fluid through said heater tubes, a plurality of hydrocarbon combustion burners positioned in the base of said container and external to said partition duct, means for conducting fluid hydrocarbon fuel and air to said burners, a concentric circular flue gas duct coaxially aligned within said partition duct and extending vertically upward from near the base of said container to external flue gas disposal means above said container, a plurality of vertically oriented boiler water tubes disposed in the annular space between said flue gas duct and said partition duct, means for passing boiler feed water into said boiler tubes, and steam recovery means connected to the upper ends of said tubes.

3. Apparatus of claim 2, in which said heater tubes are arranged in a plurality of linear banks, said banks of tubes being positioned symmetrically about the axis of said container, with each of said banks extending radially to said axis in the annular furnace section between said partition duct and said container.

4. Apparatus of claim 3, in which said burners are arranged in a plurality of linear groups, with each group of burners positioned and extending symmetrically equidistant from an adjacent pair of tube banks, and with each group of burners extending radially relative to said container axis, at the bottom of said annular furnace section.

5. Hydrocarbon reformer furnace comprising a vertically extending container, a vertical partition duct centrally disposed within said container, said partition duct extending upwards from the base of said container and terminating near the top of said container, a plurality of vertically oriented catalyst-laden reformer tubes disposed within said container and external to said partition duct, means for passing a mixture of fluid hydrocarbon and steam into said reformer tubes, means for recovering reformed gas mixture from said reformer tubes, a plurality of hydrocarbon combustion burners, positioned in the base of said container and external to said partition duct, means for conducting fluid hydrocarbon fuel and oxygen-containing gas to said burners, a central flue gas duct positioned within said partition duct and extending vertically upwards from near the base of said container to upper flue gas disposal means external to said container, a plurality of vertically oriented heat recovery tubes disposed in the space between said flue gas duct and said partition duct, means for passing heat exchange fluid into said heat recovery tubes, and means for recovering said heat exchange fluid with higher heat content from said heat recovery tubes.

6. Apparatus of claim 5, in which said heat recovery tubes comprise boiler water tubes, said means for passing heat exchange fluid into said heat recovery tubes comprise means for passing boiler feed water into said tubes, and said means for recovering heat exchange fluid with higher heat content from said heat recovery tubes comprise steam recovery means connected to the upper ends of said tubes.

7. Apparatus of claim 5, in which said upper flue gas disposal means external to said container comprises an external heat exchanger for additional recovery of heat from said flue gas, together with means for passing heat exchange fluid through said heat exchanger, and a flue gas stack extending upwards from said external heat exchanger for final flue gas disposal.

8. Apparatus of claim 7, in which said means for passing heat exchange fluid through said heat exchanger comprises an inlet duct for conducting air into said heat exchanger and an outlet duct for conducting heated air from said heat exchanger to said hydrocarbon combustion burners.

9. Hydrocarbon reformer furnace comprising a vertically extending cylindrical refractory-lined container, a concentric circular partition duct coaxially aligned within said container and extending upwards from the base of said container, said partition duct terminating near the top of said container, a plurality of catalyst-laden reformer tubes vertically suspended in the annular furnace section within said container and external to said partition duct by means of upper supports attached to the top of said container, means for admitting a mixture of fluid hydrocarbon and steam into said reformer tubes, means for removing reformed gas mixture from said reformer tubes, a plurality of hydrocarbon combustion burners positioned in the base of said container and external to said partition duct, means for conducting fluid hydrocarbon fuel and air to said burners, a concentric circular flue gas duct coaxially aligned within said partition duct and extending vertically upwards from near the base of said container to external flue gas disposal means above said container, a plurality of vertically oriented boiler water tubes disposed in the annular space between said flue gas duct and said partition duct, means for passing boiler feed water into said tubes, and steam recovery means connected to the upper ends of said tubes.

10. Apparatus of claim 9, in which each of said reformer tubes comprises an inner tube and a concentric outer tube, with the annular space between said inner and outer tubes being filled with catalyst, said inner tube being open at its lower end, said outer tube extending below said inner tube and being closed at its lower end, and said means for admitting hydrocarbon-steam mixture to and removing reformed gas mixture from each of said reformer tubes being connected to the upper end of each reformer tube.

11. Apparatus of claim 10, in which said means for admitting hydrocarbon-steam mixture to said reformer tubes is connected to said concentric outer tube, whereby said means directs said hydrocarbon-steam mixture into the upper section of the annular space between said inner and outer tubes, and said means for removing reformed gas mixture from said reformer tubes is connected to said inner tube.

12. Apparatus of claim 9, in which said reformer tubes are arranged in a plurality of linear banks, said banks of tubes being positioned symmetrically about the axis of said container, with each of said banks extending radially to said axis in the annular furnace section between said partition duct and said container.

13. Apparatus of claim 12, in which said burners are arranged in a plurality of linear groups, with each group of burners positioned symmetrically equidistant between an adjacent pair of tube banks, and with each group of burners extending radially relative to said container axis.

14. Apparatus of claim 12, in which a radiant heating plate is suspended between adjacent tube banks in the upper portion of said furnace, whereby the upper sections of said tubes are at least partially heated by radiant heat emanating from said plate.

References Cited in the file of this patent

UNITED STATES PATENTS

| | | |
|---|---|---|
| 1,174,182 | Rohrbacher | Mar. 7, 1916 |
| 1,894,215 | Brandt | Jan. 10, 1933 |
| 2,173,844 | Houdry | Sept. 26, 1939 |
| 2,184,465 | Ocon | Dec. 26, 1939 |
| 2,660,519 | McCarthy | Nov. 24, 1953 |
| 2,688,589 | Campbell et al. | Sept. 7, 1954 |